Jan. 1, 1952 — P. C. PANCAKE — 2,580,948
ANCHORING DEVICE FOR SIGNPOSTS
Filed Nov. 15, 1950
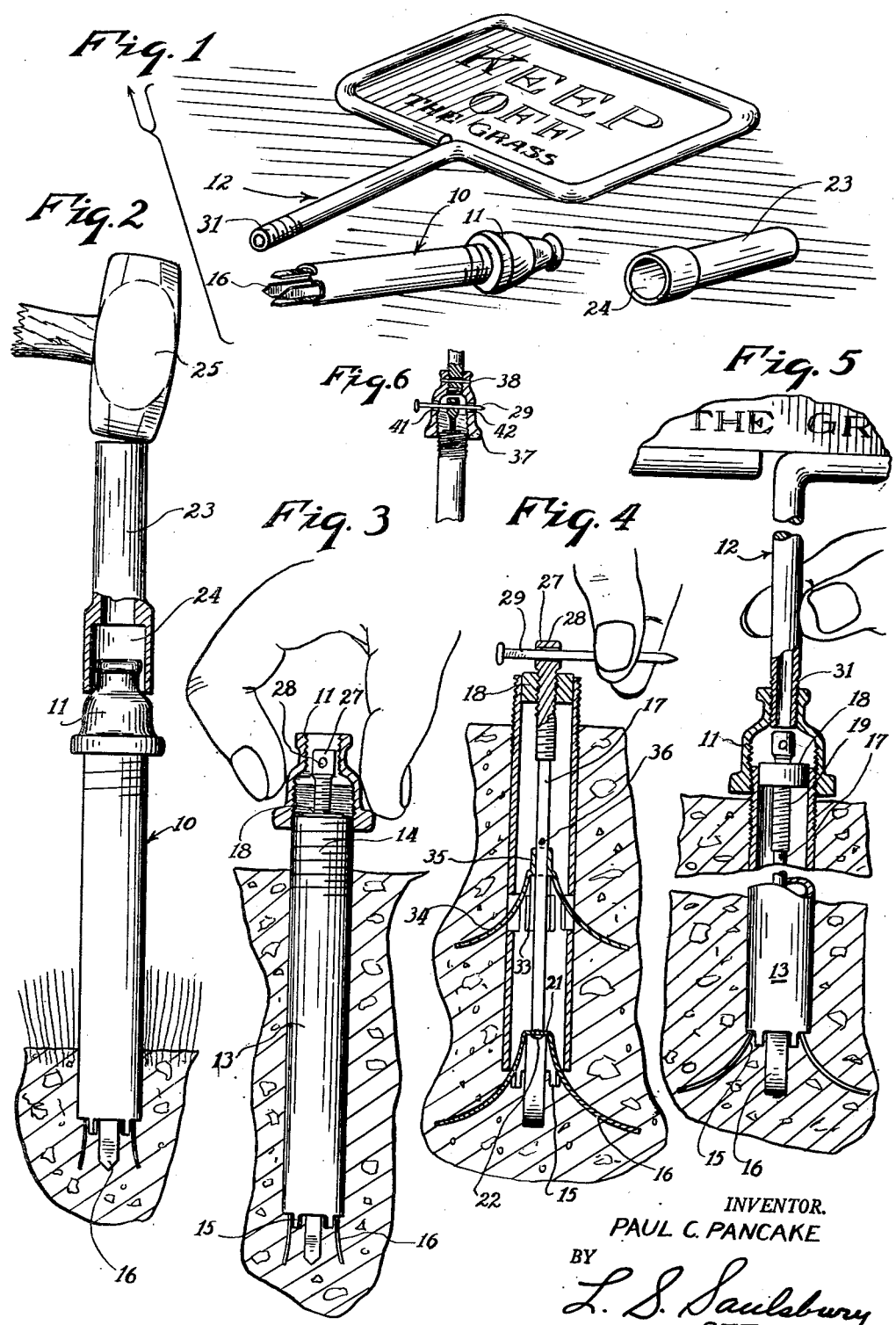
INVENTOR.
PAUL C. PANCAKE
BY L. S. Saulsbury
ATTORNEY Patented Jan. 1, 1952

2,580,948

UNITED STATES PATENT OFFICE 2,580,948

ANCHORING DEVICE FOR SIGNPOSTS

Paul C. Pancake, Huntington, W. Va.

Application November 15, 1950, Serial No. 195,877

2 Claims. (Cl. 40—125)

This invention relates to an anchoring device for fixing posts in the ground.

It is an object of the present invention to provide an anchoring device which can be inserted in the ground by a driving action and thereafter made secure by extending further into the ground anchoring elements as by a screwing action of a central shaft to which the anchoring elements are connected and operable within a pipe that can be driven into the ground and wherein during the driving operation a protective element is provided over the central adjustable screw rod to effect the driving action, said cover element being removable to permit the operation of the central adjustable rod.

It is another object of the present invention to provide an anchoring device for posts and signs which needs to be driven into the ground only a minimum amount in order to have maximum engagement therewith and wherein the fitting upon the end of the anchoring means serves as a coupling member for the attachment thereto of the post or sign and wherein the driving or hammering of the anchoring means can be effected at a low elevation rather than at a high elevation in the case of a long post which must be driven into the ground and wherein the sign or top part of the post will not be ruptured as a result of hammering since the sign or upper part of the post is added to the anchoring means after the anchoring means has been fixed to the ground.

Other objects of the present invention are to provide an anchoring means for posts and signs which is of simple construction, easy to fix upon the ground, inexpensive to manufacture, has a minimum number of parts, easy to adjust, can be stored and transported separate from the post or sign part, durable and efficient in operation.

For other objects and for a better understanding of the present invention, reference may be had to the detailed description taken in connection with the accompanying drawing, in which:

Fig. 1 is a perspective and collective view of the anchoring means and the sign part and the tool for effecting the insertion of the anchoring means in the ground.

Fig. 2 is an elevational view of the anchoring means and of the tool fitted over the top of the anchoring means and a hammer being applied to the tool to force the anchoring means into the ground.

Fig. 3 is an elevational view of the anchoring means after it has been driven in the ground and before the anchoring fingers have been spread and illustrating the manner in which the coupling member is removed to provide access to the adjusting screw which operates the spreading fingers.

Fig. 4 is a vertical sectional view of a slightly modified form of the invention wherein multiple sets of fingers are provided and illustrating the manner in which the adjusting screw is turned to effect the spreading of the anchoring fingers.

Fig. 5 is an elevational view of the anchoring device with the coupling secured thereto and after the parts have been fixed to the ground and showing the manner of attaching the sign element to the coupling member.

Fig. 6 is a sectional view of a modified form of the invention wherein a coupling part with diametrically opposite slots are used so that a nail can be extended through the slots and through the opening in the central screw rod.

Referring now to Figs. 1, 2, 3 and 5, 10 represents the anchoring device constructed according to the present invention. This anchoring device has a coupling part 11 thereon by which, after the anchoring device is fixed in the ground, a sign part 12 can be secured.

The anchoring device 10 comprises a pipe sleeve 13 which is threaded at its upper end, as indicated at 14, to receive the coupling part 11. The lower end of the pipe sleeve has circumferentially spaced projections 15 between which may be extended spring anchoring fingers 16 as central rod 17 is turned. In the upper end of the pipe sleeve 13 is a block 18 having a central threaded opening through which a threaded portion 19 of the central rod 17 extends for adjustment. The block 18 is tightly fitted and secured in the end of the pipe sleeve 13 against vertical displacement with respect thereto. As shown in Fig. 4, the fingers are formed as a part of a star piece having a hub portion 21 that is secured by the heading of a projection on the lower end of the central rod 17, as indicated at 22.

To effect the insertion of the anchoring device 10 into the ground without rupturing the parts of the device, a special tool 23 having a bottom opening 24 is fitted over the top of the coupling part 11, as illustrated in Fig. 2, and a hammer is applied to this tool. In this manner, the anchoring device 10 will, by repeated blows of hammer 25, be forced into the ground to the position shown in the figures. In order to provide access to the upper threaded end portion 19 of the central rod 17 and more particularly head 27 of the rod having hole 28 therein, the coupling member 11 is removed in the manner as indicated in Fig. 3. A nail 29, as shown in Fig. 4, can be extended through the hole 28 so that the central rod 17 can be adjusted through the block 18. After the central rod has been lowered sufficiently to set the anchor fingers 16, the nail 29 is withdrawn and the coupling member 11 may then be applied. The lower end of the sign 12 is threaded, as indicated at 31, so as to fit the reduced portion of the coupling member 11.

In Fig. 4, the pipe sleeve is provided with a plurality of circumferentially spaced openings 33 therearound through which extend fingers 34 of a member 35 which is journalled upon the central rod 17 in order to permit the vertical adjustment of the rod by a turning action. A pin 36 extending through the rod holds the member 35 against upward displacement and as the rod moves down presses downwardly upon the rod to move the spring fingers 34 outwardly through the openings 33 in the same manner that the fingers 16 are spread. The sides of the openings 33 keeps the fingers from turning while the adjustment is being effected.

In Fig. 6, there is provided a coupling member 37 that is secured to the threaded portion 31 by threaded engagement and also by a pin 38 that is placed therein to lock the parts together after the coupling member has been threaded upon the sign part 12.

In order to set the fingers at the same time the coupling part 11 is placed upon the pipe sleeve 13, diametrically opposite slots 41 and 42 are provided in the coupling member and nail 29 is extended through these slots and the opening 28 in the head 27 of the central rod 17. Accordingly, as the coupling member is turned by the sign part 12, the fingers 16 will be spread outwardly. In order to prevent the reverse action of the removal of the anchor means, the nail 29 can be withdrawn. The nail will accordingly serve as the key for effecting the adjustment of the fingers. It will be apparent that other suitable means can be used to interlock the central shaft with the sign post.

It will be apparent that with the present anchoring device, posts and signs can be easily and quickly erected upon the ground. The operation can be effected with simple tools and in an easy manner.

While various changes may be made in the detail construction, it shall be understood that such changes shall be within the spirit and scope of the present invention as defined by the appended claims.

What is claimed is:

1. A sign post construction comprising an anchoring device including a pipe sleeve, a central rod having a threaded portion thereon, said pipe sleeve having a block fixed thereto and with a threaded opening in which the central rod threaded portion extends for adjustment, spring finger elements secured to said central rod and curved to be forced outwardly as the central rod is threaded through the block, said central rod having on its threaded end an opening through which a nail or the like can be extened to effect the adjustment of the central rod, a coupling member threaded to the upper end of the pipe sleeve, a sign part having a depending threaded post portion securable to the coupling member.

2. A sign post construction comprising an anchoring device including a pipe sleeve, a central rod having a threaded portion thereon, said pipe sleeve having a block fixed thereto and with a threaded opening in which the central rod threaded portion extends for adjustment, spring finger elements secured to said central rod and curved to be forced outwardly as the central rod is threaded through the block, said central rod having on its threaded end an opening through which a nail or the like can be extended to effect the adjustment of the central rod, a coupling member threaded to the upper end of the pipe sleeve, a sign part having a depending threaded post portion securable to the coupling member, means for securing the coupling member to the sign post against relative rotation with respect thereto, said coupling member having diametrically opposite vertically extending elongated slots adapted to receive a nail or the like to connect the coupling member to the opening of the vertically extending shaft so that upon connecting the coupling member to the upper end of the pipe sleeve by threading action the central shaft will be automatically adjusted to spread the anchor fingers, and said nail adapted to serve as a key to permit the adjustment of the anchor fingers.

PAUL C. PANCAKE.

REFERENCES CITED

The following references are of record in the file of this patent:

UNITED STATES PATENTS

| Number | Name | Date |
| --- | --- | --- |
| 2,546,530 | Vogel | Mar. 27, 1951 |